UNITED STATES PATENT OFFICE.

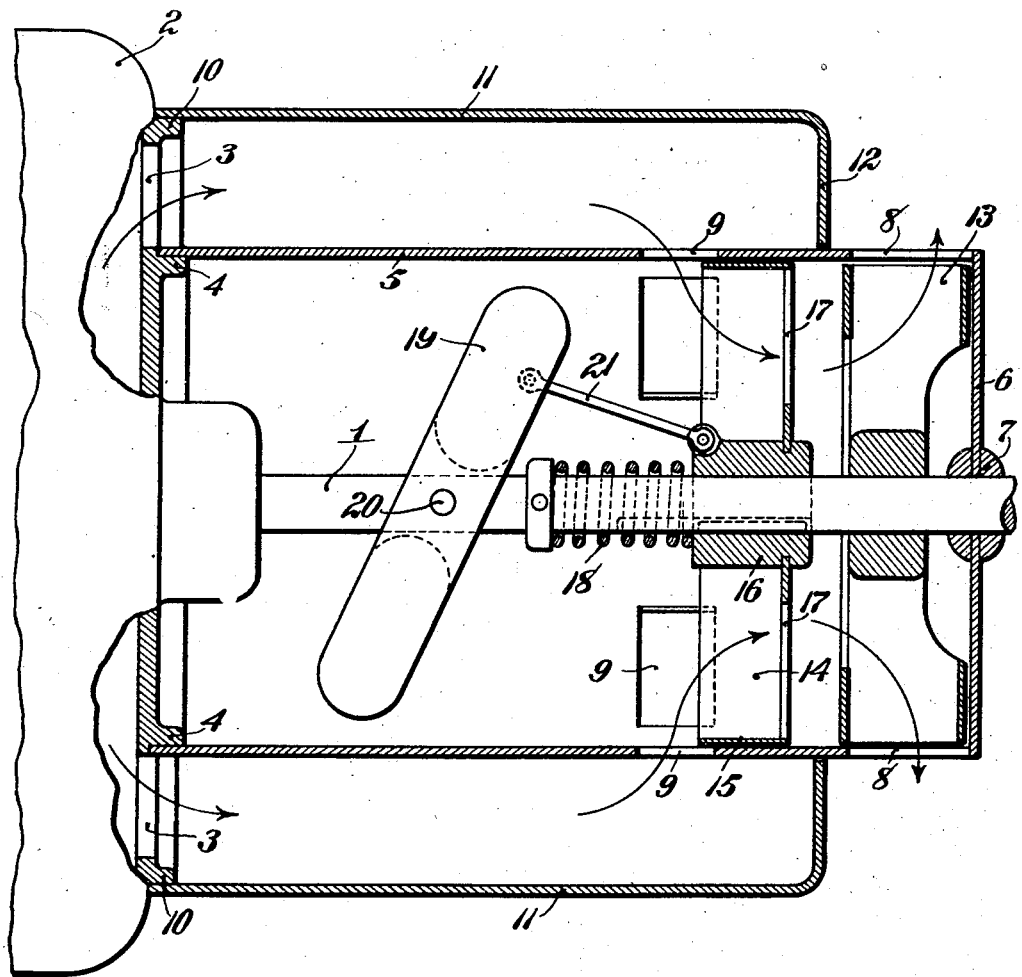

HERBERT A. BALCOME, OF BOSTON, MASSACHUSETTS, ASSIGNOR TO THE HOLTZER-CABOT ELECTRIC COMPANY, OF BROOKLINE, MASSACHUSETTS, A CORPORATION OF MASSACHUSETTS.

ELECTRIC MOTOR OR GENERATOR.

1,004,230.  Specification of Letters Patent.  Patented Sept. 26, 1911.

Application filed November 17, 1910. Serial No. 592,832.

*To all whom it may concern:*

Be it known that I, HERBERT A. BALCOME, a citizen of the United States, residing at West Roxbury, Boston, in the county of Suffolk and State of Massachusetts, have invented certain new and useful Improvements in Electric Motors or Generators; and I do hereby declare the following to be a full, clear, and exact description of the invention, such as will enable others skilled in the art to which it appertains to make and use the same.

The present invention relates to electric motors or generators, and more particularly to the cooling of the so-called adjustable speed types of such machines which are designed to normally operate over a considerable range of speed.

It is common to artificially supply a cooling circulation of air to an electric motor or generator to conduct away the heat generated in the machine. When a motor or generator is designed to normally run at a fairly constant speed, the means for supplying the artificial cooling circulation of air may be proportioned to supply a sufficient circulation to cool the machine at its normal speed. However, if the machine is designed to operate over a considerable range of speed certain difficulties are encountered with such artificial cooling.

The moving parts of the machine, especially if they be provided with air ducts, tend of themselves to cause a circulation of air through the machine, so that in many cases when such a machine is running at its highest speeds very little, if any, power need be expended by any other means to aid in the cooling circulation of air. Hence at higher speeds the power used by a separate blowing means in inducing the circulation of air might be reduced and still a sufficient circulation of air pass through the machine to cool it. Moreover, when the blowing means for causing the artificial circulation of air is driven by the motor or generator itself, the circulation of air artificially caused thereby will increase as the speed of the motor or generator increases. Hence, if said blowing means be large enough to cause a sufficient circulation of air to cool the motor or generator at its lower speeds, the amount of air delivered by said blowing means at the higher speeds will be greatly in excess of the requirements for cooling, and the load imposed upon the blowing means to cause such an excessive circulation of air may amount to the greater part of the total load carried by the machine. It is, therefore, imperative for the economical operation of such machines that some means be employed to relieve the blowing means from a part of the load imposed upon it in causing an artificial circulation of air when the motor or generator is running at its higher speeds.

With the above matters in view, the object of the present invention is to provide means acting automatically to restrict the circulation of air through the motor or generator from exceeding the amount which is necessary to cool it at the speed at which it is running, whereby the blowing means is relieved of having an unnecessary load imposed upon it in supplying a greater circulation of air than is required.

The present invention contemplates broadly the attainment of this object by any suitable means which will automatically restrict the load imposed upon the blowing means in maintaining the circulation of air at different speeds of the motor or generator. Such means operates as the speed of the motor or generator increases, to restrict said load by decreasing, relatively to the speed of the motor or generator, the air delivery of said blowing means in any suitable manner. Such relative decrease in the air delivery may actually reduce the circulation of air, maintain it constant in amount, or prevent it from increasing proportionally to the increase in speed of the motor or generator. If the circulation of air is restricted, the load imposed on the blowing means in causing the air circulation will likewise be restricted, and the blowing means relieved of doing unnecessary work. The means for restricting the circulation of air may be so arranged that, if the moving parts of the machine do not materially contribute in causing the air to circulate, the power expended by the blowing means in causing the circulation of air may be kept approximately constant at all speeds of the machine, or that, if the moving parts of the machine act as blowers to materially aid in causing the circulation of air, the power expended by the blowing means in maintaining the total circulation of air may be reduced as the speed of the machine increases. Moreover, the means for restricting the circulation of air may be so arranged that the volume of air per minute passing through the machine at different speeds may be constant or may be varied in amount to suit the different types of machines or conditions under which they are to be operated.

The simplest and most efficient manner of restricting the circulation of air supplied by the blowing means, is by throttling said flow or circulation of air. The means for throttling the circulation of air preferably comprises dampers or checks in the passages through which the air is forced.

In the drawing, the preferred embodiment of the invention is illustrated, the view showing a side elevation taken partly in section.

Referring to the drawing, the shaft 1 of a motor of generator extends through the end of the casing 2 of the machine. The casing is provided with openings 3 through which the air is drawn to cause a cooling circulation through the heated parts of the machine. Secured to an annular flange 4 on the casing within the region of these openings is a sheet metal drum 5 whose outer end is closed by a cap 6 in which is provided a bearing 7 for the shaft of the machine. The periphery of the drum 5 is provided with openings 8 at its outer end, and with other openings 9 nearer its middle. Secured to an annular flange 10 on the casing 2 outside of the region of the openings 3 is another drum 11, the outer end of which is bent in to form a flange 12 which extends to the drum 5 between its two sets of openings 8 and 9. An annular air passage is thus formed between the drums 5 and 11, and it is designed that the air shall circulate through it as indicated by the arrows, coming through the openings 3 in the motor or generator, passing through the openings 9 into the inner drum, and then escaping through the openings 8. This circulation of air is caused by a fan 13 mounted upon the shaft 1 directly inside of the openings 8. The circulation of air caused by the fan 13 is restricted by a damper 14 which is designed to be moved to vary the areas of the air admission openings 9. The damper 14 comprises a drum-like rim 15 supported upon a hub 16 by a spider 17 which allows the passage of air longitudinally therethrough. The hub 16 is splined to slide longitudinally on the shaft 1, about which is coiled a helical compression spring 18 which normally holds the damper in position to uncover the openings 9. The damper is moved to reduce the free areas of the openings 9 by the action of a wheel 19 transversely pivoted at 20 to the shaft 1. When the shaft is rotated, the wheel 19 will tend to set itself at right angles to the shaft and will pull upon the link 21 which connects it to the hub 16 of the damper, and draw the damper along the shaft against the compression of the spring 18. The amount of force tending to turn the wheel 19 will increase with the speed of the machine, so that as the speed increases the damper will act more and more to reduce the area of the openings 9, and thus throttle or regulate the circulation of air caused by the fan 13 through the machine. The weight of the wheel 19 and the strength of the spring 18 are relatively of such proportions that the openings 9 will be so reduced by the damper 14 that, when the speed of the machine increases, the circulation of air caused by the fan will not be of an amount greatly in excess of that necessary to cool the machine. Since the circulation of air is thus throttled or restricted by the damper 14, the volume of air driven by the fan will not be increased unnecessarily when the machine is run at its high speeds, as would be the case if the circulation were not restricted, and the fan will be relieved of an unnecessarily great blowing load as the speed of the machine increases.

The present invention is not limited to the specific embodiment as illustrated and described, but may be embodied in other forms within the spirit of the invention and the scope of the following claims:

1. An electric motor or generator, having, in combination, means to supply a cooling circulation of air thereto, an air passage for the conduction of said circulation of air, a damper in said air passage controlled by the speed of the motor or generator to regulate the circulation of air.

2. An electric motor or generator, having, in combination, means to supply a cooling circulation of air thereto, an air passage for the conduction of said circulation of air, a damper in said air passage, and centrifugally operated means controlled by the speed of the motor or generator to actuate said damper to regulate the circulation of air.

3. An electric motor or generator, having, in combination, means for supplying a cooling circulation of air thereto, and means having provision for automatically decreasing, relatively to the speed of the motor or generator, the air delivery of said blowing means as the speed of the motor or generator increases.

4. An electric motor or generator, having, in combination, means to supply a cooling circulation of air thereto, and means to automatically restrict the circulation of air as the speed of the motor or generator increases.

HERBERT A. BALCOME.

Witnesses:
Roy T. Wells,
Fred. B. Dolan.